US009690689B2

(12) United States Patent
Pedro de Castro

(10) Patent No.: US 9,690,689 B2
(45) Date of Patent: Jun. 27, 2017

(54) TEST CASE GENERATION IN A DEVELOPMENT ENVIRONMENT

(71) Applicant: Microsoft Technology Licensing, LLC, Redmond, WA (US)

(72) Inventor: Gabriel Pedro de Castro, Kenmore, WA (US)

(73) Assignee: Microsoft Technology licensing, LLC, Redmond, WA (US)

(*) Notice: Subject to any disclaimer, the term of this patent is extended or adjusted under 35 U.S.C. 154(b) by 0 days.

(21) Appl. No.: 14/696,114

(22) Filed: Apr. 24, 2015

(65) Prior Publication Data
US 2016/0314062 A1 Oct. 27, 2016

(51) Int. Cl.
G06F 9/44 (2006.01)
G06F 11/36 (2006.01)

(52) U.S. Cl.
CPC ...... *G06F 11/3684* (2013.01); *G06F 11/3664* (2013.01)

(58) Field of Classification Search
CPC .................. G06F 11/3688; G06F 11/3692
See application file for complete search history.

(56) References Cited

U.S. PATENT DOCUMENTS

| 5,781,720 A * | 7/1998 | Parker ................. G06F 11/3688 714/38.11 |
| 6,006,028 A | 12/1999 | Aharon et al. |
| 6,397,378 B1 * | 5/2002 | Grey ................... G06F 11/3688 714/E11.207 |
| 7,505,991 B2 | 3/2009 | Fifield et al. |
| 8,429,614 B2 | 4/2013 | Zhang et al. |
| 8,522,195 B2 | 8/2013 | Miloslavsky et al. |
| 8,996,631 B1 * | 3/2015 | Staddon ................ H04L 9/3271 709/200 |
| 2002/0166081 A1 * | 11/2002 | Richardson ....... G06F 17/30067 714/33 |
| 2005/0154550 A1 * | 7/2005 | Singh ................. G01R 31/3183 702/108 |

(Continued)

FOREIGN PATENT DOCUMENTS

CN 102541730 A 7/2012

OTHER PUBLICATIONS

Mariani, et al. "Link. Exploiting the Web of Data to Generate Test Inputs a Deported View Concept for Touch", In Proceedings of International Symposium on Software Testing and Analysis, Jul. 21, 2014, 12 pages.

(Continued)

*Primary Examiner* — Chameli Das
(74) *Attorney, Agent, or Firm* — Christopher J. Volkmann; Kelly, Holt & Christenson, PLLC

(57) ABSTRACT

A development system comprises a user interface component and a customization component configured to receive developer customization inputs and to customize a portion of a computing system based on the developer customization inputs. The portion comprises types modeled in the computing system. The development system also comprises a test generation component configured to identify a test value by accessing a test knowledge set based on the types, control the user interface component to generate a user interface display that displays an indication of the test value, and generate a test for the portion of the computing system.

19 Claims, 13 Drawing Sheets

(56) References Cited

U.S. PATENT DOCUMENTS

| | | | | |
|---|---|---|---|---|
| 2006/0179386 | A1* | 8/2006 | Pushpavanam | G06F 11/3688 |
| | | | | 714/742 |
| 2006/0206512 | A1* | 9/2006 | Hanrahan | G06F 17/30554 |
| 2007/0033440 | A1* | 2/2007 | Tillmann | G06F 11/3684 |
| | | | | 714/38.14 |
| 2009/0007084 | A1 | 1/2009 | Conallen et al. | |
| 2009/0077531 | A1 | 3/2009 | Miloslavsky et al. | |
| 2009/0204591 | A1* | 8/2009 | Kaksonen | G06F 11/3684 |
| 2009/0319832 | A1* | 12/2009 | Zhang | G06F 11/3684 |
| | | | | 714/38.1 |
| 2010/0318379 | A1* | 12/2010 | Demopulos | G06Q 10/10 |
| | | | | 705/3 |
| 2011/0016453 | A1* | 1/2011 | Grechanik | G06F 11/368 |
| | | | | 717/125 |
| 2012/0159441 | A1 | 6/2012 | Ghaisas | |
| 2012/0222014 | A1* | 8/2012 | Peretz | G06F 11/3688 |
| | | | | 717/125 |
| 2013/0104105 | A1* | 4/2013 | Brown | G06F 11/3684 |
| | | | | 717/124 |
| 2014/0172512 | A1 | 6/2014 | Chandra et al. | |
| 2014/0229917 | A1 | 8/2014 | Chiantera et al. | |
| 2014/0337052 | A1* | 11/2014 | Pellini | G06Q 50/24 |
| | | | | 705/3 |
| 2015/0161031 | A1* | 6/2015 | Chea | G06F 11/3672 |
| | | | | 717/125 |
| 2015/0378743 | A1* | 12/2015 | Zellermayer | G06F 9/4401 |
| | | | | 713/2 |

OTHER PUBLICATIONS

Kuemper, et al., "From Semantic IoT-Service Descriptions to Executable Test Cases—Information Flow of an Implemented Test Framework", In Proceedings of the Sixth International Conference on Advances in System Testing and Validation Lifecycle Oct. 12, 2014, pp. 28-35.

Bai, et al., "WSDL-Based Automatic Test Case Generation for Web Services Testing", In IEEE International Workshop Service-Oriented System Engineering, Oct. 21, 2005, 6 pages.

Yuan, et al "Generating Event Sequence-Based Test Cases Using GUI Run-Time State Feedback", in IEEE Transactions on Software Engineering. vol. 36. Issue 1. Jan. 2010, 16 pages.

Askarunisa et al.. "A Test Case Reduction Method for Semantic Based Web Services", In Proceedings of International Conference on Computing Communication and Networking Technologies, Jul. 29, 2010, 7 pages.

International Search Report and Written Opinion for International Patent Application No. PCT/US2016/027506, date of mailing: Jun. 27, 2016, date of filing: Apr. 14, 2016, 11 pages.

T Wegener et al.: "Tessy-An Overall Unit Testing Tool", Jan. 1, 1995, 15 pages. Retrieved from the Internet: URL:http://www.systematic-testing.com/documents/qualityweek1995_2.pdf Retrieved on Jul. 14, 2011.

International Preliminary Report on Patentability for International Patent Application No. PCT/US2016/027506, date of mailing: Mar. 14, 2017, date of filing: Apr. 14, 2016, 7 pages.

* cited by examiner

| TYPE ID 416 | TEST VALUE 1 418 | TEST VALUE 2 420 | TEST VALUE 3 422 | TEST VALUE 4 424 | TEST VALUE 5 426 |
|---|---|---|---|---|---|
| MONETARY AMOUNT | -1.2 | 0 | 1 | 17.25 | |
| FLOATING POINT | 0 | | | | |
| UNIT PRICE | | | | | |
| QUANTITY | -1 | 0 | 0.5 | 17 | |
| STRING | 'NULL' | | | | |
| BOOLEAN | TRUE | FALSE | | | |
| HOURS | 0 | 24 | | | |

FIG. 4-1

```
<typeValues>
452   <valueGroup>
         <type>Monetary Amount</type>
         <values>-1.2; 0; 1; 17.25</values>
      </valueGroup>
454   <valueGroup>
         <type>Floating Point</type>
         <values>0</values>
      </valueGroup>
456   <valueGroup>
         <type>Unit Price</type>
         <values> </values>
      </valueGroup>
458   <valueGroup>
         <type>Quantity</type>
         <values>-1; 0; 0.5; 17</values>
      </valueGroup>
460   <valueGroup>
         <type>String</type>
         <values>'NULL'; 0</values>
      </valueGroup>
462   <valueGroup>
         <type>Boolean</type>
         <values>TRUE; FALSE</values>
      </valueGroup>
464   <valueGroup>
         <type>Hours</type>
         <values>0; 24</values>
      </valueGroup>
</typeValues>
```

TEST CASE GENERATION IN A DEVELOPMENT ENVIRONMENT

BACKGROUND

Computer systems are currently in wide use. Some computer systems are relatively large, and may include, for instance, thousands of different user interface and data entities, like tables, forms, and other artifacts. Such computer systems are often customized (some heavily customized) before they are deployed in a given implementation. For example, computer systems can be developed on various development tools. Many software developers use interactive (or integrated) development environments (IDEs) in order to develop software. The developers use an IDE in order to develop models of types within a computer system, and in order to customize those models.

By way of example, some computer systems include enterprise resource planning (ERP) systems, customer relations management (CRM) systems, line-of-business (LOB) systems, among others. These types of computer systems often include many thousands of different types that are modeled and customized. For instance, some such systems often have thousands of different forms, alone, not to mention many other types. Such systems also commonly include a great deal of logic, as well as workflows, and data entities (such as tables) that allow users to access the system and perform a set of activities, or tasks, in order to carry out their duties within a particular organization for which they are working.

These systems are not the only types of computing systems that have a large number of types. For instance, gaming systems, or a wide variety of other types of systems, often also have many thousands of different types that are modeled in the computing system.

The various types that are modeled in the computing system are compiled (or assembled) into assemblies that are run during runtime. The modeled types can represent data or workflow. For instance, the computing system may store information as a collection of entities, where each entity represents an item associated with an organization. A customer entity, for example, may represent a customer. A sales order entity, for instance, may represent a sales order. A sales quote entity may represent a sales quote. These are illustrative examples only.

When such a computing system is deployed in a specific organization, it is common for the computing system to be highly customized in order to meet the functional requirements of the particular organization in which it is deployed. By way of example, different organizations may wish to have different fields on a given form that represents a customer entity. In addition, for example, different organizations may wish to have different logic for computing a currency conversion on an expense report form. Thus, it can be seen that a given computing system may be heavily customized so that it meets the requirements of a given organization that is using it.

The discussion above is merely provided for general background information and is not intended to be used as an aid in determining the scope of the claimed subject matter.

SUMMARY

A development system comprises a user interface component and a customization component configured to receive developer customization inputs and to customize a portion of a computing system based on the developer customization inputs. The portion comprises types modeled in the computing system. The development system also comprises a test generation component configured to identify a test value by accessing a test knowledge set based on the types, control the user interface component to generate a user interface display that displays an indication of the test value, and generate a test for the portion of the computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4-1 illustrates one example of a test knowledge set.

FIG. 4-2 illustrates one example of a test knowledge set.

DETAILED DESCRIPTION

Figure 1:
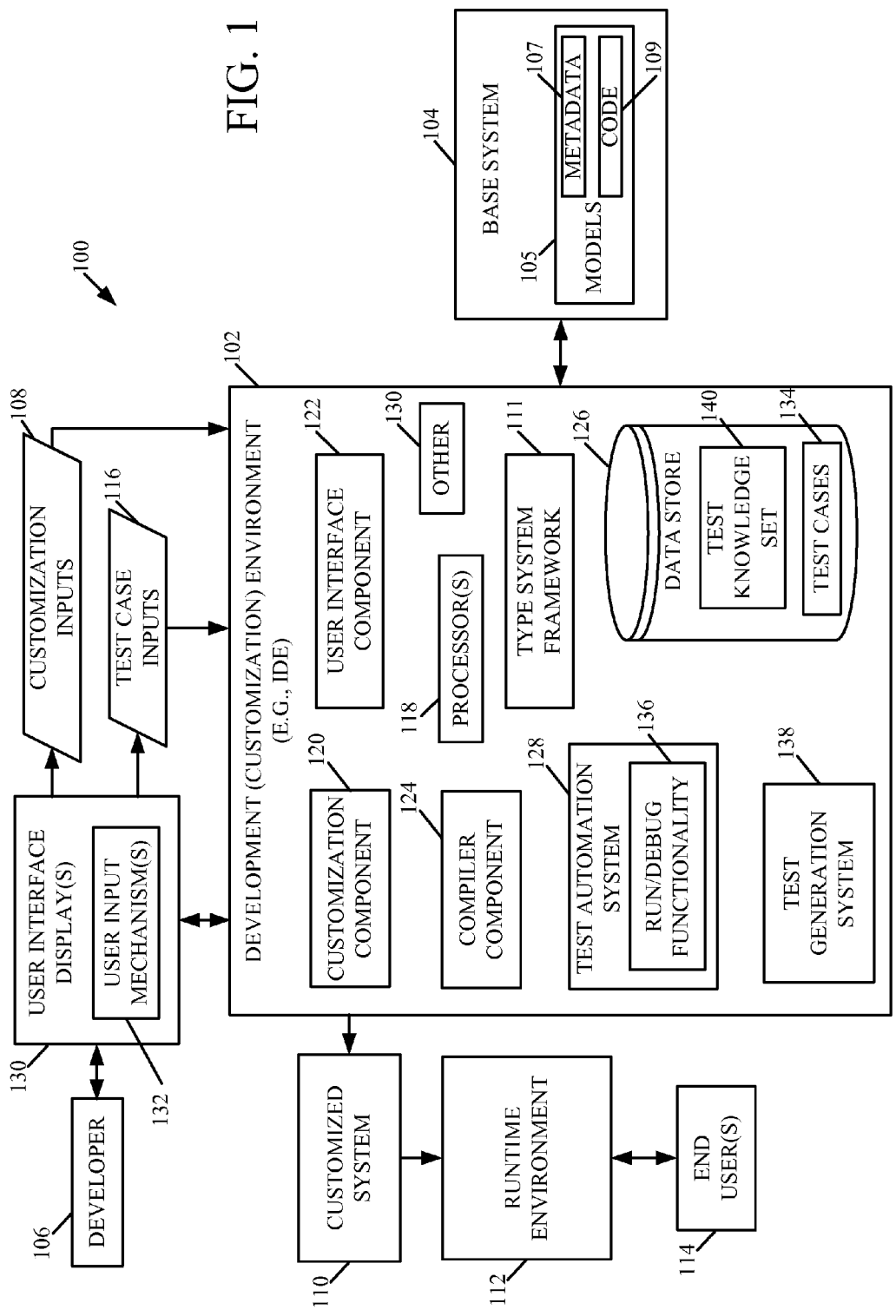
FIG. 1 is a block diagram of one example of a development architecture.

FIG. 1 is a block diagram of one example of a development (customization) architecture 100 that includes a development environment (such as an integrated development environment or IDE) 102 having development functionality for developing, customizing, and/or extending a base system 104 having application elements (or objects) that are run in a computing system. A developer 106 provides customizations inputs 108 to development environment 102 in order to customize (further develop, modify, or extend) base system 104 to meet the functional requirements of an organization, so that a customized system 110 can be successfully deployed in a runtime environment 112 used by an end user 114 of the organization.

By way of example, base system 104 can comprise a gaming system, an electronic mail (e-mail) system, a collaboration system, a document sharing system, a scheduling system, and/or an enterprise system. In one example, base system 104 comprises a business system, such as an enterprise resource planning (ERP) system, a customer resource management (CRM) system, a line-of-business system, or another business system.

FIG. 1 shows that, in one example, base system 104 includes models 105 which comprise containers that hold corresponding metadata 107 and can have code 109 as well. In the illustrated example, models 105 include metadata and code corresponding to various different types of application elements (i.e., types) within base system 104. Depending on the particular base system, models 105 can comprise thousands of different element types that are stored in a type store. The types can be defined based on a type system framework 111 employed by development environment 102.

A "type" represents an abstraction, representing concepts modeled in a system. In one example, architecture 100 employs a rich hierarchical type system where base types can be extended to create more complex subtypes. A base type comprises a basic or primitive component within the models. Examples of base types include, but are not limited to, an integer type, a string type, a floating point number type, an enumeration value type, a Boolean type, etc. These base types can be extended to create subtypes such as, but not limited to, a quantity type, a currency code type, a sales price type, an hour type, etc. These subtypes can be further extended to create more complex types.

Figure 2:
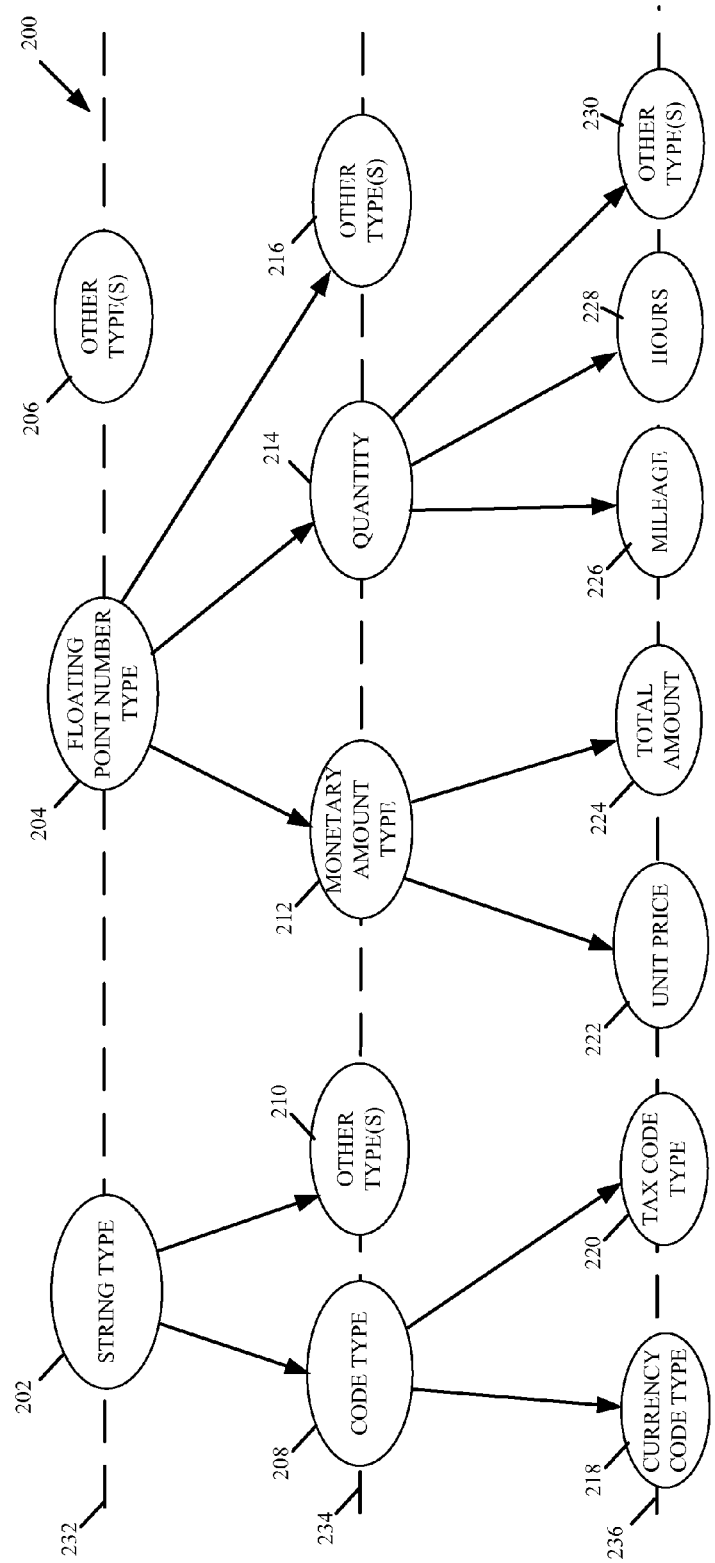
FIG. 2 illustrates a portion of a type hierarchy model, in one example.

FIG. 2 illustrates a portion of a type hierarchy model 200, in one example. FIG. 2 illustrates a plurality of nodes 202-230 arranged in a plurality of hierarchical levels 232, 234, and 236. The nodes are arranged in hierarchical parent/child relationships in which a parent node has one or more child nodes that depend therefrom, and each child node depends from at least one parent node. The number of levels and nodes in FIG. 2 is by way of example only. Any number of nodes and levels can be modeled within architecture 100. For example, in one implementation the types represented at level 236 can be further extended to create subtypes at a fourth level in the hierarchy.

Each node 202-230 represents a type modeled in base system 104. Nodes 202, 204, and 206 each represents a base type. Nodes 208 and 210 each represent a subtype that is an extension from the string base type represented at node 202. Nodes 212, 214, and 216 each represent a subtype that is an extension from the floating point number base type represented at node 204. Further, nodes 218 and 220 each represent a subtype that is an extension of the code type represented by node 208. Similarly, nodes 222 and 224 each represent a subtype that is an extension from the monetary amount type represented by node 212, and nodes 226, 228, and 230 each represent a subtype that is an extension of the quantity type represented by node 214. These, of course, are examples only.

As developer 106 customizes base system 104, model 200 can be updated to reflect new types, deleted types, and/or changes to the type hierarchy (e.g., if a child node is re-parented to a different node).

Types can be used to represent various abstractions or concepts in an organization (such as, but not limited to, a customer, a sales order, an employee, etc. in an ERP or CRM system) or in the way the organization information is processed for the specific needs of the organization (such as hiring an employee, creating an order, process an approval, etc.). Some examples of such types include, but are not limited to, tables (which each represent a persisted, object such as a sales order), classes (that contain logic), forms (that represent the presentation of information for the consumers of the information), security roles (represents the access control for information to the consumers), workflows (that represents the flow of processes), menu items, entities, permissions, and other supporting concepts to define the application. These types are defined by a structure of elements each described using a set of attributes or properties (e.g., key/value pairs) and an associated set of operations that are used to interact with the construct. The particular structure of properties, methods, and/or computations define runtime behavior for elements of the given element type. For example, a table element type can include a name (e.g., "customer table") and a set of properties that identify attributes for a customer (e.g., customer ID, address, etc.). Also, in this example, the table element type can include a method for computing a value for the customer and/or a method for displaying the value.

In one example, the types of system 104 are persisted or stored in a type store as documents or files with a defined schema (e.g., extensible markup language (XML), javascript object notation (JSON), a proprietary schema, etc.) in a storage medium, such as a computer file system, database, or cloud storage.

In one example, metadata 107 and code 109 for each type are serialized into an XML file. Development environment 102 includes a type accessing component configured to serialize the types into their storage (e.g., XML file) representations as they are stored into the type store, and to deserialize the storage representations into their physical, source code representations as they are retrieved from the type store for development within development environment 102. The source code representations can comprise objects in an object-oriented programming environment. Any suitable programming language(s) can be utilized in development environment 102.

Development environment 102 includes one or more processors 118, a customization component 120, a user interface component 122, a compiler component 124, a data store 126, and a test automation system 128. Development environment 102 can include other components 130 as well.

FIG. 1 shows a variety of different functional blocks. It will be noted that the blocks can be consolidated so that more functionality is performed by each block, or they can be divided so that they functionality is further distributed. It should also be noted that data store 126 can be any of a wide variety of different types of data stores. Further, data store 126 can be stored in multiple data stores. Also, the data stores can be local to the environments, agents, modules, and/or components that access them, or they can be remote therefrom and accessible by those environments, agents, modules, and/or components. Similarly, some can be local while others are remote.

Each processor 118 comprises a computer processor with associated memory and timing circuitry (not shown). The processor is illustratively a functional part of environment 102 and is activated by, and facilitates the functionality of, other systems, components and items in environment 102.

Customization component 120 provides customization tools to make customizations to base system 104. For example, the customization tools can include a type customization component that enables developer 106 to customize the types in models 105 of base system 104. Customizations can include additive changes to the metadata 107 or code 109 or functionality of base system 104, as well as non-additive changes. As such, the customization tools can include a source code editor, a metadata editor, and one or more build automation tools. Environment 102 can also include a version control system and various tools to facilitate the construction of graphical user interfaces. Environment 102 can also include a class browser, an object browser, and a class hierarchy diagram for use with object oriented software development. Thus, developer 106 can use environment 102 to generate the code and metadata, along with customizations to code and metadata, which may be utilized in developing base system 104.

Developer 106 can interact with development environment 102 either through a separate developer device (such as a personal computer, a tablet, another mobile device, etc.), or directly. Developer 106 can also interact with development environment 102 over a network (e.g., remotely). Developer 106 is shown interacting directly (e.g., locally) with development environment 102 in FIG. 1 for the sake of example only.

User interface component 122 generates user interface displays 130 with user input mechanisms 132, for interaction by developer 106. Developer 106 interacts with user input mechanisms 132 in order to control and manipulate development environment 102. In one example, developer 106 can do this to implement customization tools or any other component(s) of development environment 102.

User input mechanisms 132 sense physical activities, for example by generating user interface displays that are used to sense user interaction with environment 102. The user interface display(s) 130 can include user input mechanism(s) 132 that sense user input in a wide variety of different ways, such as point and click devices (e.g., a computer mouse or track ball), a keyboard (either virtual or hardware), and/or a keypad. Where the display device used to display the user interface display(s) 130 is a touch sensitive display, the inputs can be provided as touch gestures. Similarly, the user inputs can illustratively be provided by voice inputs or other natural user interface input mechanisms as well.

When base system 104 is authored (before it is customized) it may include a number of different tests that can be run to determine whether the system is working properly. Also, as developer 106 customizes or continues to develop on base system 104, developer 106 can also author test cases, to test the customizations generated, by providing test case inputs 116. Developer 106 thus provides customization inputs 108 and test case inputs 116 through appropriate user interface displays 130 to environment 102. In response, customization component 120 customizes base system 104 and can store the customizations and other information in data store 126. Test cases 134 can also be stored in data store 126.

At build time, base system 104 along with its customizations are compiled by compiler component 124. Also, during the build process, test cases 134 can also be compiled by compiler component 124 into assemblies that can be run by test automation system 128 to perform the respective tests. Test automation system 128 includes run and debug functionality 136 so developer 106 can run one or more of the test cases and debug the system. In one example, once developer 106 has made customizations, developer 106 may wish to run a set of test cases that have been affected by the customizations (or that reference objects that have been in some way changed or extended based on the customizations).

When generating test cases, it can be difficult for developer 106 to identify relevant tests for new functionality added to base system 104. For example, developer 106 can provide customization inputs 108 to add a new method having input parameters, which, at runtime, receive input values. Developer 106 may not have knowledge as to relevant test values that should be entered as input values to the method parameters. This can be especially problematic for developers who are new to a functional area as they may not be aware of all scenarios valid for the domain. A frequent source of bugs in a system occurs where a particular instance of a type was not considered because a developer did not know about its relevance or even its existence. Further, it is difficult to generate system-relevant values for each input type that are combined in a meaningful and manageable way without an exponential growth in the number of test cases.

For sake of illustration, in one example a method added by developer 106 comprises a currency conversion for a given exchange rate. Developer 106 desires to test this new method but may not know what values should be tested (such as testing different types of currencies and/or testing for rounding errors). Developer 106 may be unaware of and likely to forget to test a number of relevant values. In another example, a method added by developer 106 receives a quantity parameter. However, developer 106 may be unaware that the quantity received in the method can be a negative number and/or floating point number.

Figure 3:
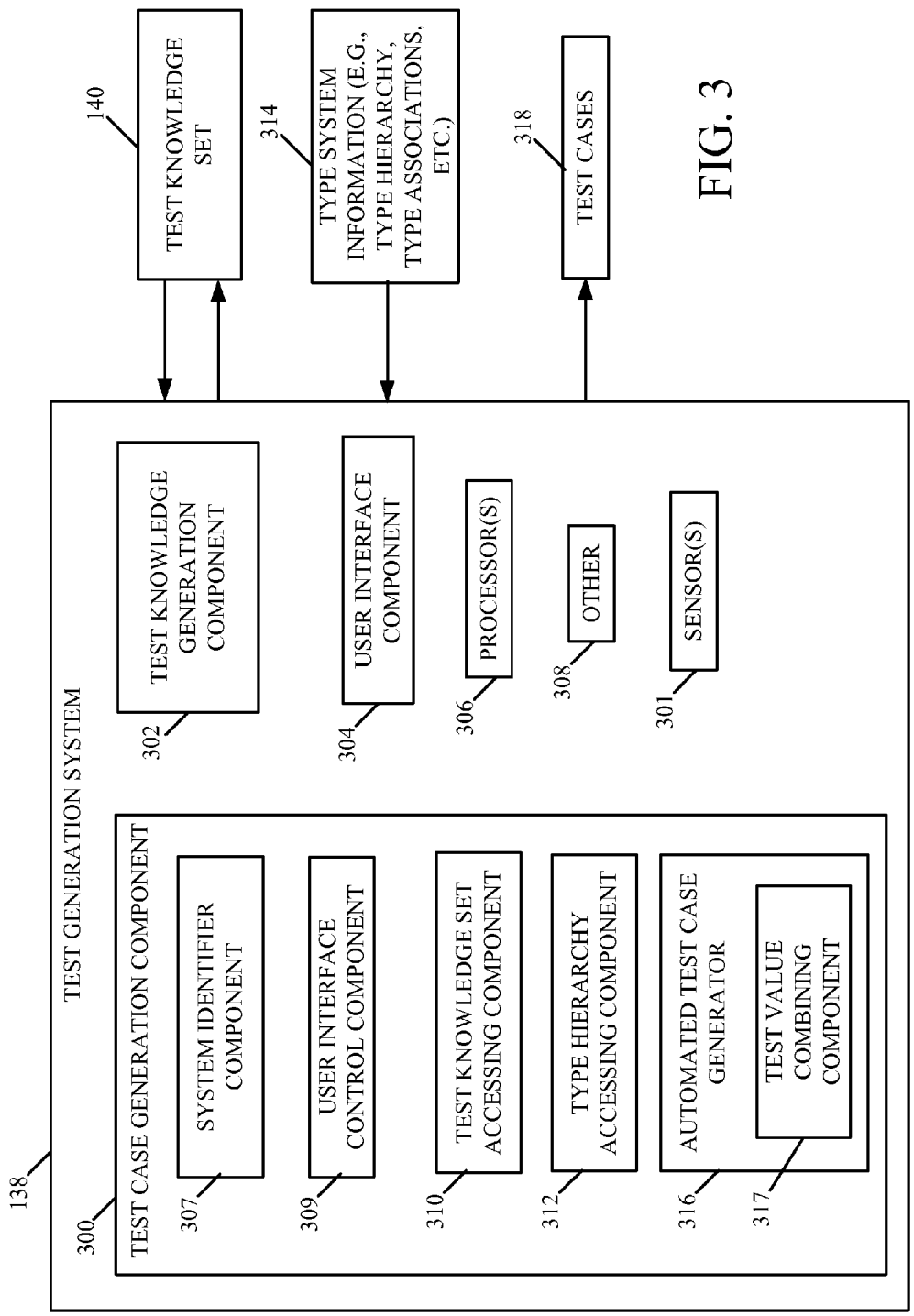
FIG. 3 is a block diagram of one example of a test generation system.

In the example of FIG. 1, development environment 102 includes a test generation system 138 that leverages the type system framework 111 for generating test cases 134. As discussed in further detail below, test generation system 138 uses a test knowledge set 140 in creating test cases 134. FIG. 3 is a block diagram illustrating one example of test generation system 138.

As shown in FIG. 3, test generation system 138 includes a test case generation component 300, one or more sensors 301, a test knowledge generation component 302, a user interface component 304, and one or more processors 306. Test generation system 138 can include other items 308 as well.

Sensor(s) 301 are configured to detect inputs to test generation system 138. User interface component 304 is configured to generate user interface displays, for example to developer 106.

In the illustrated example, test case generation component 300 includes a system identifier component 307, a user interface control component 309, a test knowledge set accessing component 310, a type hierarchy accessing component 312, and an automated test case generator 316 that includes a test value combining component 317.

System identifier component 307 is configured to identify a portion of the system being customized for which one or more tests are to be generated. For example, component 307 detects a user input that identifies a particular application element or object (e.g., a particular method, form, table etc.) for which to generate a test case. User interface control component 309 is configured to control user interface component 304 to generate various user interface displays during the test generation process.

Test knowledge set accessing component 310 is configured to access and analyze test knowledge set 140. Type hierarchy accessing component 312 is configured to access and analyze type system information 314. This can include identifying a type hierarchy (such as the hierarchy illustrated in FIG. 2) and/or information on type associations modeled within base system 104. Using test knowledge set 140 and the type system information 314, automated test case generator 316 can be used to generate test cases 318 that can be stored in data store 126, for example.

In one example, test knowledge set 140 comprises a knowledge base of suggested test values for each type modeled within base system 104. A test value can include numerical value(s) and/or non-numerical value(s) (e.g., a string, a Boolean value, or other non-numerical values). The knowledge base maps one or more test values to each of a plurality of different types. These test values can be used to generate test cases 318.

FIG. 4-1 illustrates one example of a test knowledge set in the form of a table 400. Table 400 comprises a plurality of entries 402-414, each entry comprising a different type. Each entry has a type ID field 416 and one or more test values fields that store test values for the corresponding type. In the illustrated example, table 400 comprises test value fields 418-426. However, any number of test values fields can utilized based on the number of test values for the types.

FIG. 4-2 illustrates another example of a test knowledge set in the form of an XML file 450. In the example of FIG. 4-2, each file section 452-464 (identified by the identifier "valueGroup" in the present example) contains one or more types and a list of test values (a semi-colon separated list in the present example). In both examples of FIGS. 4-1 and 4-2, the type "Quantity" has test values of −1, 0, 0.5, and 17 and the type "Monetary Amount" has test values of −1.2, 0, 1, and 17.25. In one example, a single XML file is generated for all types in the system. Of course, multiple XML files can be utilized.

The test knowledge set 140 maps a type identification to test values. Test knowledge set 140 can be created and/or updated in any of a variety of ways. For example, developer 106 can update test knowledge set 140 during the development process. In another example, test knowledge set 140 can be updated when errors are encountered in runtime environment 112.

Figure 5:
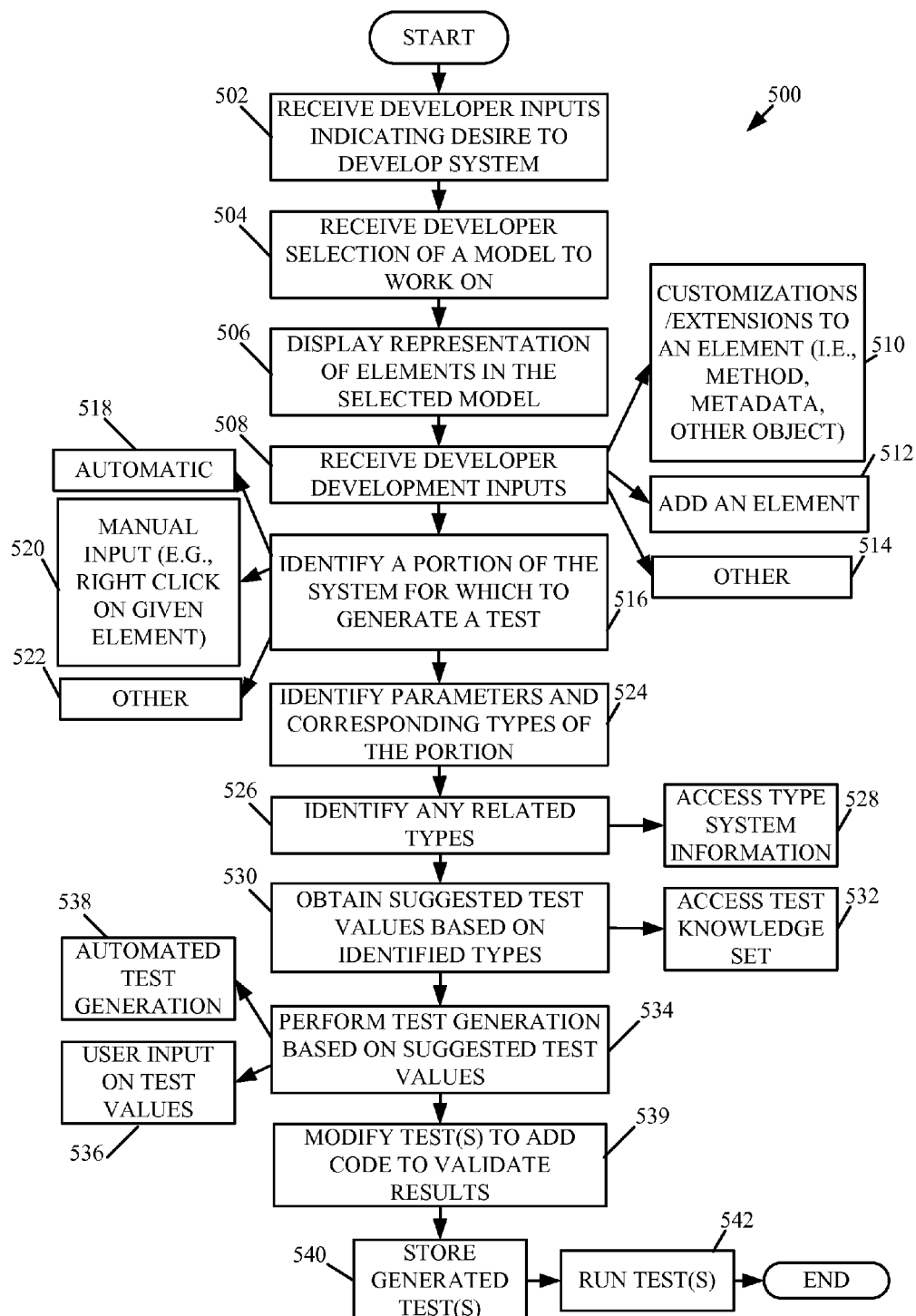
FIG. 5 is a flow diagram of one example of a method for testing a system being developed.

FIG. 5 is a flow diagram of one example of a method 500 for testing a system being customized by a developer. For the sake of illustration, but not by limitation, method 500 will be described in the context of architecture 100.

At step 502, development environment 102 receives developer inputs indicating a desire to develop base system 104. Then, at step 504, customization component 120 generates user interface displays that allow developer 106 to provide an input selecting a given model to work on. Customization component 120 can then display a representation of various elements that developer 106 may wish to access, during the customization process. This is indicated by block 506.

Customization component 120 then receives developer inputs performing the actual development operations. This is indicated by block 508. For example, developer 106 provides customization inputs 108 through user interface displays 130. The customization inputs 108 can generate customizations or extensions to a given element (e.g., a method of a given object, metadata for a given object, or other information). This is indicated by block 510. Developer 106 can also provide inputs adding an element to a given model. This is indicated by block 512. Of course, the development inputs can be inputs which provide other customizations or developments as well. This is indicated by block 514.

At step 516, the method identifies a portion of the system (e.g., a given element, or collection of elements) for which to generate a test (for example using system identifier component 307). For example, the portion of the system can comprise a particular method, form, table, or other object(s). Step 516 can occur automatically, for example in response to the user providing the development inputs. This is indicated by block 518. In another example, the portion of the system is identified by a manual input, such as a user clicking on or otherwise selecting a particular element. This is represented by block 520. Of course, the portion of the system can be identified in other ways as well. This is indicated by block 522. For the sake of the following discussion, at step 516 developer 106 right clicks on a new method added at step 508 and selects a test generation option. At runtime, this new method is configured to receive two input parameters (i.e., a price parameter and a quantity parameter) and calculates a sales order price. This, of course, is by way of example only.

Then, the method 500 proceeds to identify test values using test knowledge set 140. At step 524, method 500 identifies types associated with the portion of the system for which the test is being generated. For example, step 524 identifies the various input parameters for the selected portion of the system (i.e., the price parameter and the quantity parameter) and the corresponding types of those input parameters (i.e., Unit Price type and Quantity type, respectively).

At step 526, the method identifies any related types that are related to the types identified at step 524. In the illustrated example, the method accesses the type system information (i.e., type system information 314 in FIG. 3) at step 528. In the present example, step 528 identifies that the "Unit Price" type is a subtype of "Monetary Amount" type, and that "Monetary Amount" type is a subtype of "Floating Point" type. Similarly, step 528 identifies that "Quantity" is a subtype of "Floating Point" type.

At step 530, the method obtains suggested test values based on the types identified at steps 524 and 526. The suggested test values are obtained by accessing test knowledge set 140 at step 532. In the present example, for the first input parameter (i.e., price), step 532 returns the test values associated with the types Unit Price, Monetary Amount, and Floating Point. For the second input parameter (i.e., quantity), step 532 returns the test values associated with the types Quantity and Floating Point.

At step 534, one or more test cases are generated based on the suggested test values. For example, automated test case generator 316 uses test value combining component 317 to combine the returned test values into one or more combinations. For each input parameter, a test case is generated for each combination of test values. In the illustrated example, step 534 can include receiving user input at step 536 that accepts, modifies, adds, and/or deletes the test values. At step 538, automated test generation is performed.

In one example, method 500 includes a step 539 in which developer 106 modifies the generated tests to add code that performs validation of the test results. For example, where a test includes a method call, the test provide the test values as inputs to the method. At step 539, the developer 106 can add code that validates the results of the method call.

The generated tests are stored at step 540. At step 542, the generated tests can be run, if desired. Alternatively, or in addition, the generated tests can be stored in data store 126 to be run at a later time. When a test is run, its test values are provided as inputs to the corresponding elements being tested to generate test results. For example, test automation system 128 uses run and debug functionality 136 so developer 106 can surface test results and correct customizations or extensions of the system that are not running properly.

Figure 6:
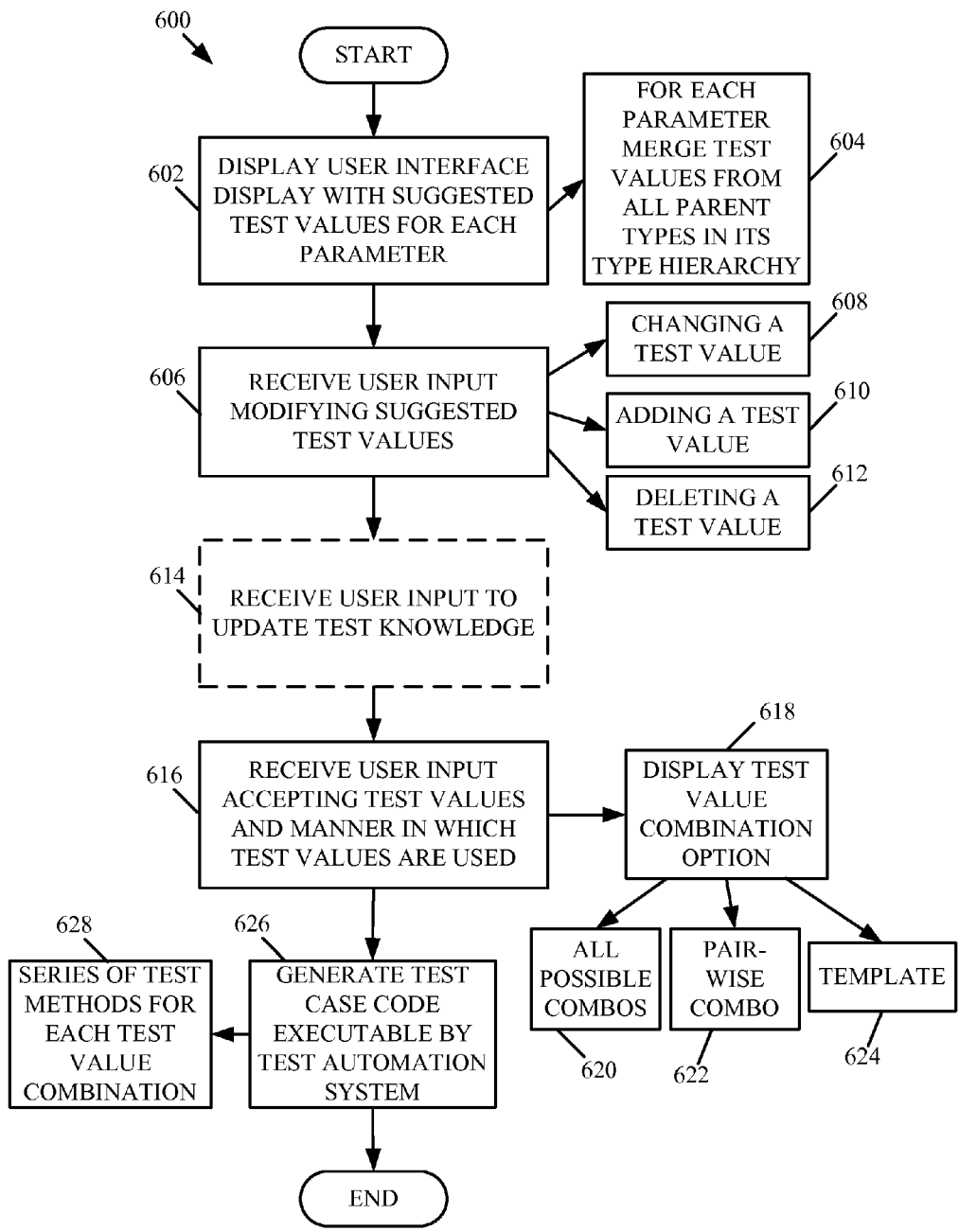
FIG. 6 is a flow diagram of one example of a method for generating a test.

FIG. 6 is a flow diagram of one example of a method 600 for performing test generation. For the sake of illustration, but not by limitation, method 600 will be described in the context of using architecture 100 to generate a test at step 534 in FIG. 5.

Figure 7:
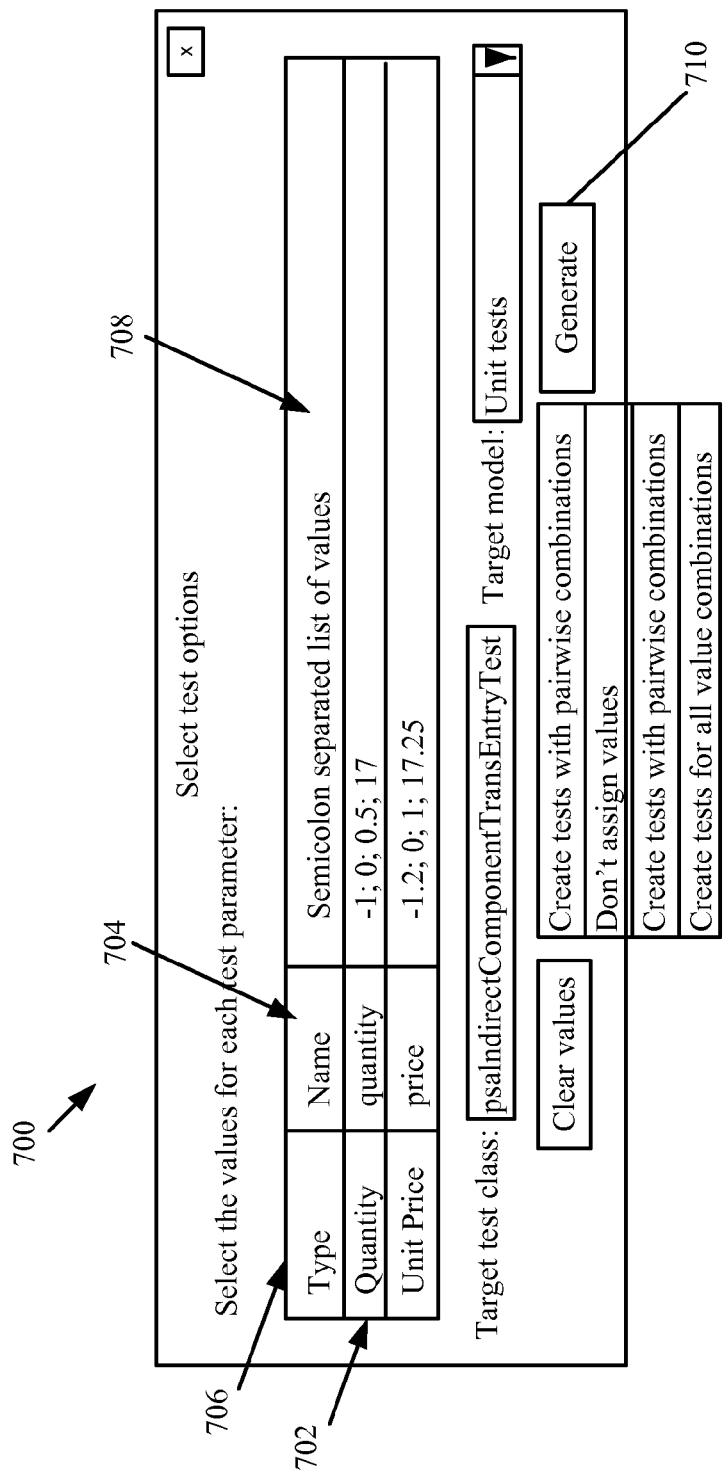
FIG. 7 is a screenshot of one example of a user interface for defining test values.

At step 602, the method displays a user interface display with the suggested test values for each input parameter. In one example, for each input parameter, the test values from all parent types in its type hierarchy are merged at step 604. One example of a user interface displayed at step 602 is illustrated in FIG. 7.

User interface 700 displays a plurality of entries in a list 702. Specifically, user interface 700 includes a plurality of entries in a table, each entry having a parameter name field 704, a type field 706, and a test value field 708. Parameter name field 704 identifies the parameter and type field 706 identifies the type of the parameter. Field 708 displays a merged collection of the test values. A user-actuatable control 710 is provided to accept the test values for test generation.

Referring again to FIG. 6, a user input can be received that modifies the suggested test values. For example, for one or more of the input parameters in list 702, a user can change a test value at step 608, add a test value at step 610, or delete a test value at step 612. For example, using user interface 700, a user can select field 708 to modify the list of test values.

Optionally, at step 614, the test knowledge set 140 can be updated. For example, a user input can be provided to update test knowledge set 140 based on the user input provided at step 606. For instance, if a user added a test value at step 610, this new test value can be added to test knowledge set 140.

At step 616, the user accepts the test values to be used in generating the test. In one example of step 616, the user also provides an input to select a manner in which the test values are used to generate the test. For instance, at step 618 test value combination options can be displayed to the user. Examples include, but are not limited to, generating all possible combinations for the test values. This is represented at block 620. In the example of FIG. 7, all possible combinations of the test values would result in sixteen test case combinations being generated (i.e., four test values for the quantity parameter and four test values for the price parameter).

Another example of a test value combination option is a pair-wise combination. This is represented at block 622. Pair-wise testing uses a combinatorial method that, for each pair of parameters, tests all possible discrete combinations of those parameters. In another example, at block 627 a template based test generation option can be provided. In this example, the template-based option ignores the suggestions by providing a test code template that can be completed by the user manually entering test values.

Once the user accepts the test values, the method proceeds to step 626 in which the test case code is generated for execution by test automation system 128. In one example, the test case code comprises a series of test methods that are generated for each test value combination. This is represented by block 628.

It can thus be seen that the present description provides significant technical advantages. For example, it provides a test generation framework that increases the quality of the system by identifying test case issues that may not be understood by a developer and otherwise result in system errors. For example, a developer who is new to a domain may not realize the semantics of the values and may fail to properly generate test cases for the system. For instance, a developer may not know that a quantity field can be a negative number or a floating point number. Additionally, as new objects are added, this framework can extend the test knowledge set to the new objects which decreases test generation time. The test generation framework generates test cases in a manner that is efficient, flexible, requires less developer time, and improves the developed system.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
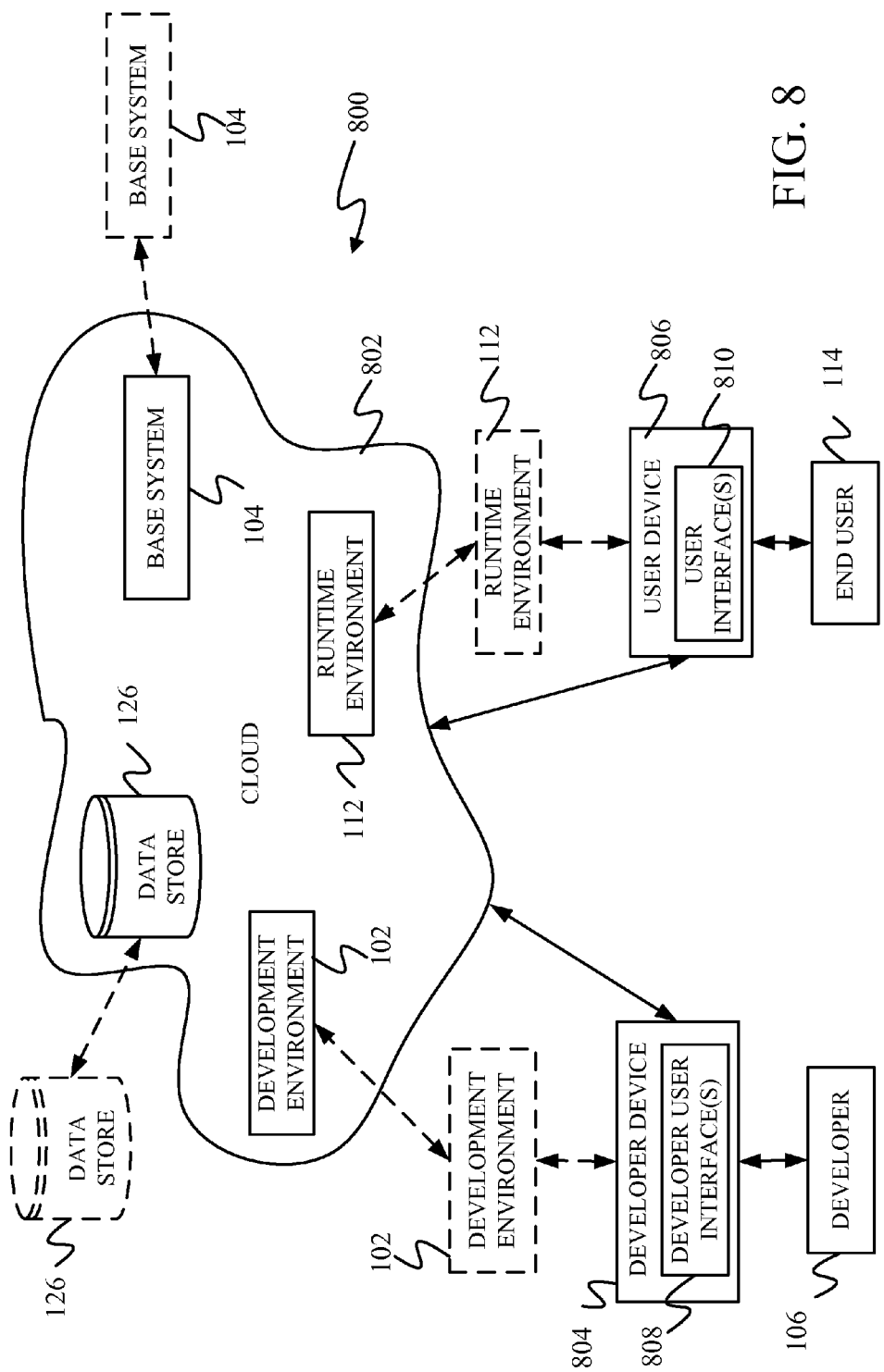
FIG. 8 is a block diagram showing one example of the architecture illustrated in FIG. 1, deployed in a cloud computing architecture.

FIG. 8 is a block diagram of architecture 100, shown in FIG. 1, except that its elements are disposed in a cloud computing architecture 800. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that development environment 102, base system 104, runtime environment 112, and data store 126 can be located in cloud 802 (which can be public, private, or a combination where portions are public while others are private). Therefore, developer 106 and end user 114 use a developer device 804 and user device 806, respectively, to access those systems through cloud 802. Developer device 804 renders user interfaces 808 to developer 106 and user device 806 renders user interfaces 810 to end user 114.

FIG. 8 also depicts another example of a cloud architecture. FIG. 8 shows that it is also contemplated that some elements of architecture 100 can be disposed in cloud 802 while others are not. By way of example, data store 126 can be disposed outside of cloud 802, and accessed through cloud 802. In another example, development environment 102 can also be outside of cloud 802, and accessed through cloud 802. In another example, runtime environment 112 can also be outside of cloud 802, and accessed through cloud 802. In another example, base system 104 can also be outside of cloud 802, and accessed through cloud 802. Regardless of where they are located, they can be accessed directly by devices 804 and 806, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
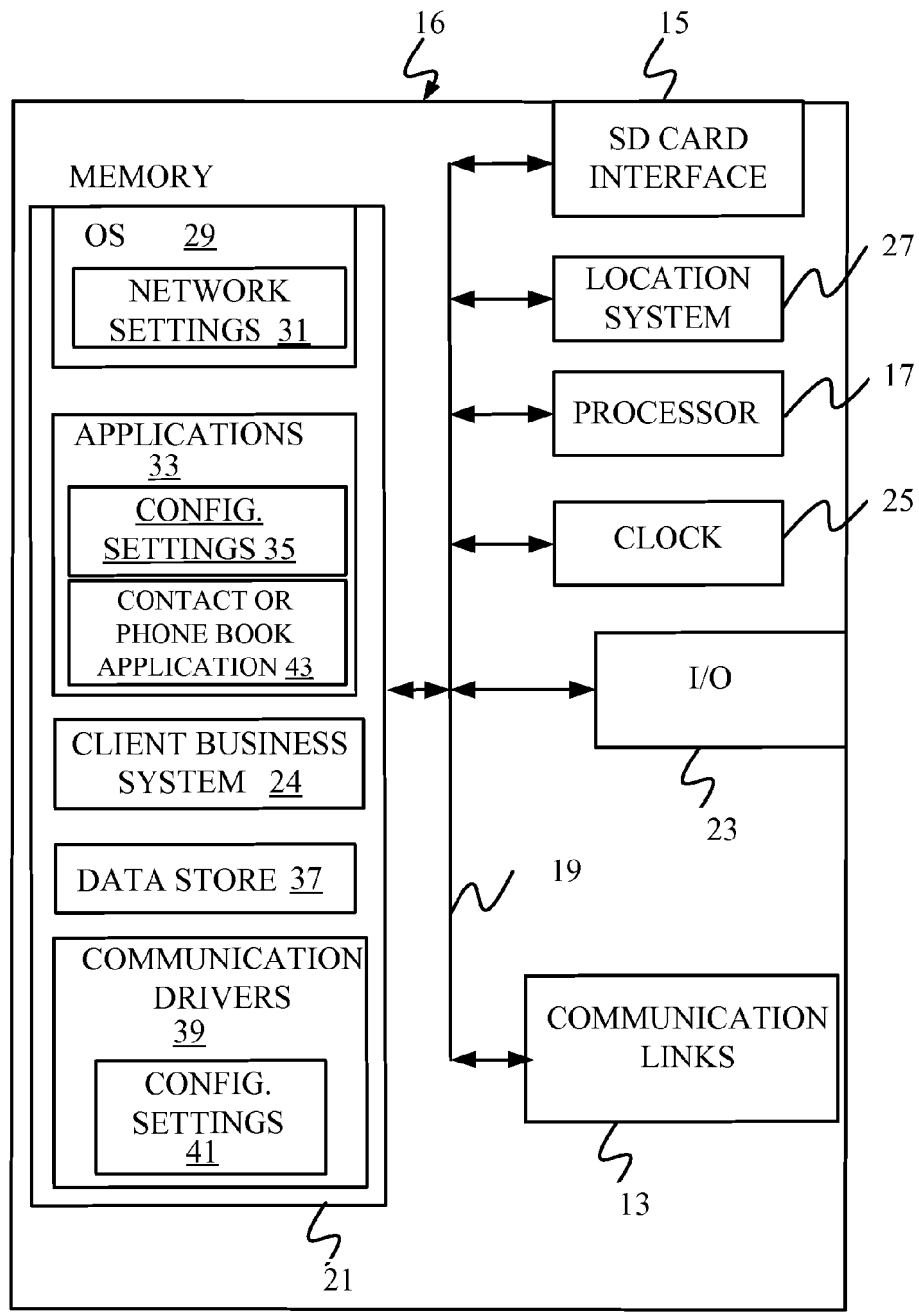
FIGS. 9-11 show various examples of mobile devices that can be used in the architectures discussed in the previous figures.
Figure 10:
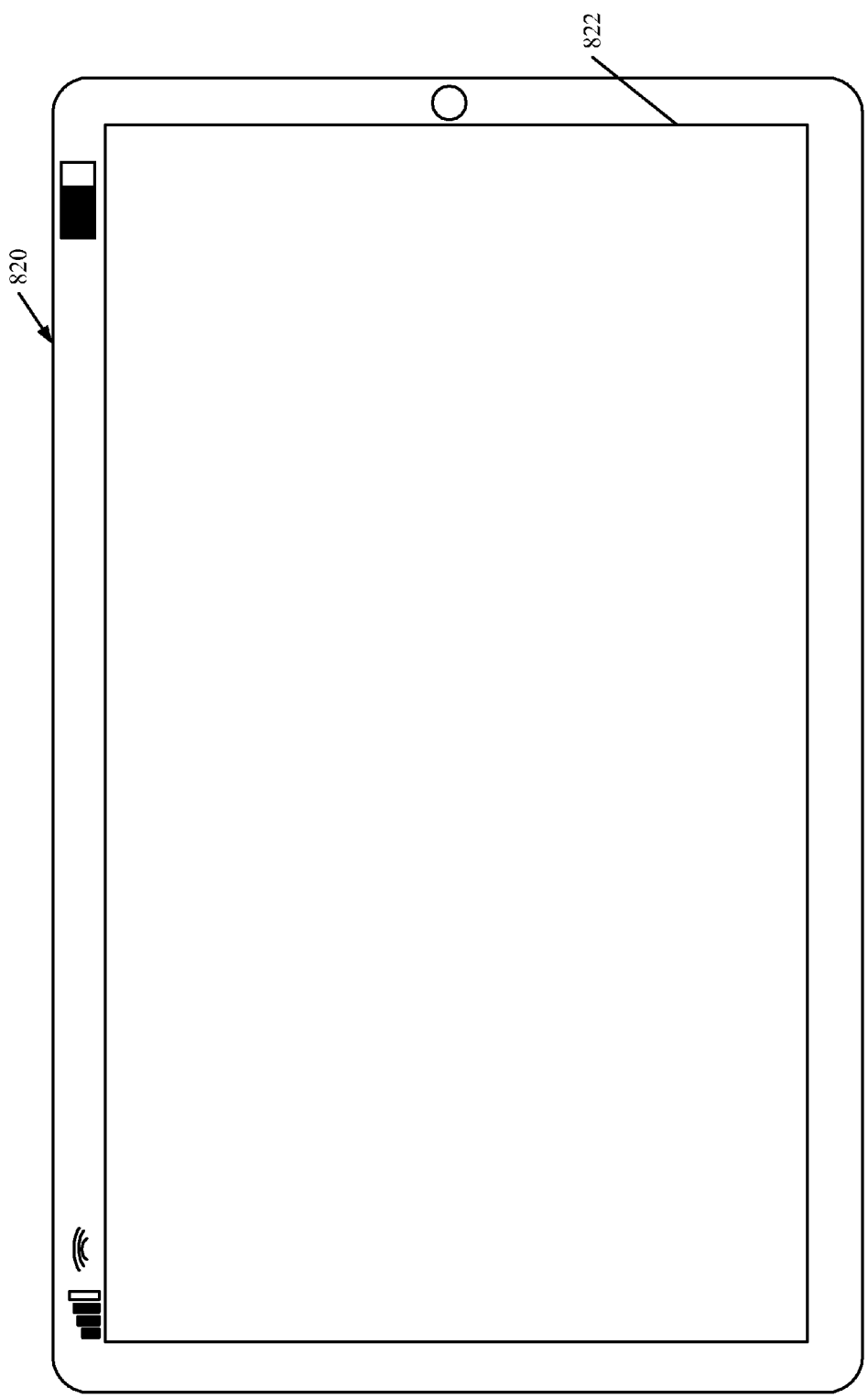
Figure 11:
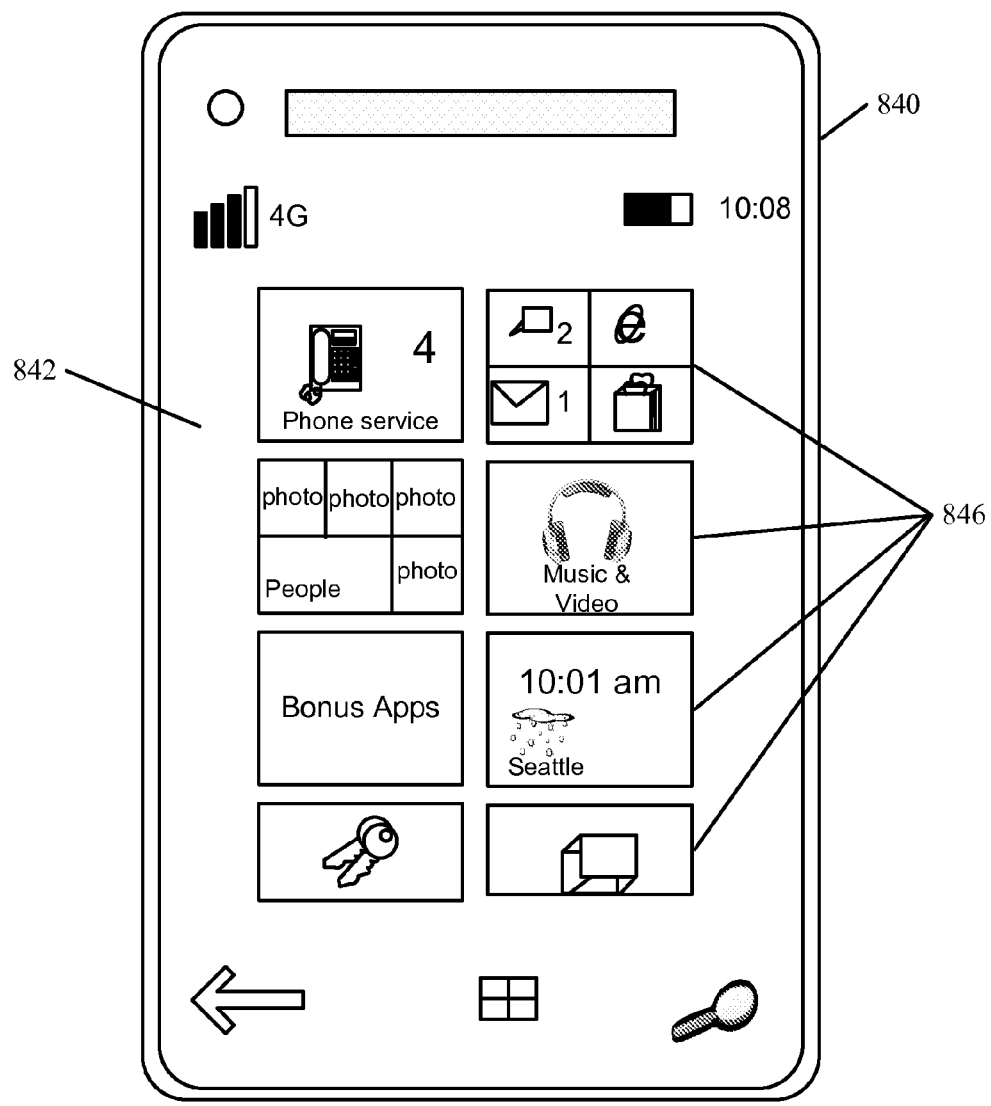

FIG. 9 is a simplified block diagram of one illustrative embodiment of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can interact with architecture 100. In one example, client device 16 can run components of runtime environment 112 or development environment 102, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 (which can also embody processor(s) from FIG. 1 and/or processor(s) 306 from FIG. 3) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one embodiment in which device 16 is a tablet computer 820. In FIG. 10, computer 820 is shown with user interface display screen 822. Screen 822 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 820 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1xrtt, and Short Message Service (SMS) signals. In some examples, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 11 shows that the phone can be a smart phone 840. Smart phone 840 has a touch sensitive display 842 that displays icons or tiles or other user input mechanisms 844. Mechanisms 844 can be used by a user to run applications, make calls, perform data transfer operations, etc. In general, smart phone 840 is built on a mobile operating system and offers more advanced computing capability and connectivity than a feature phone.

Note that other forms of the devices 16 are possible.

Figure 12:
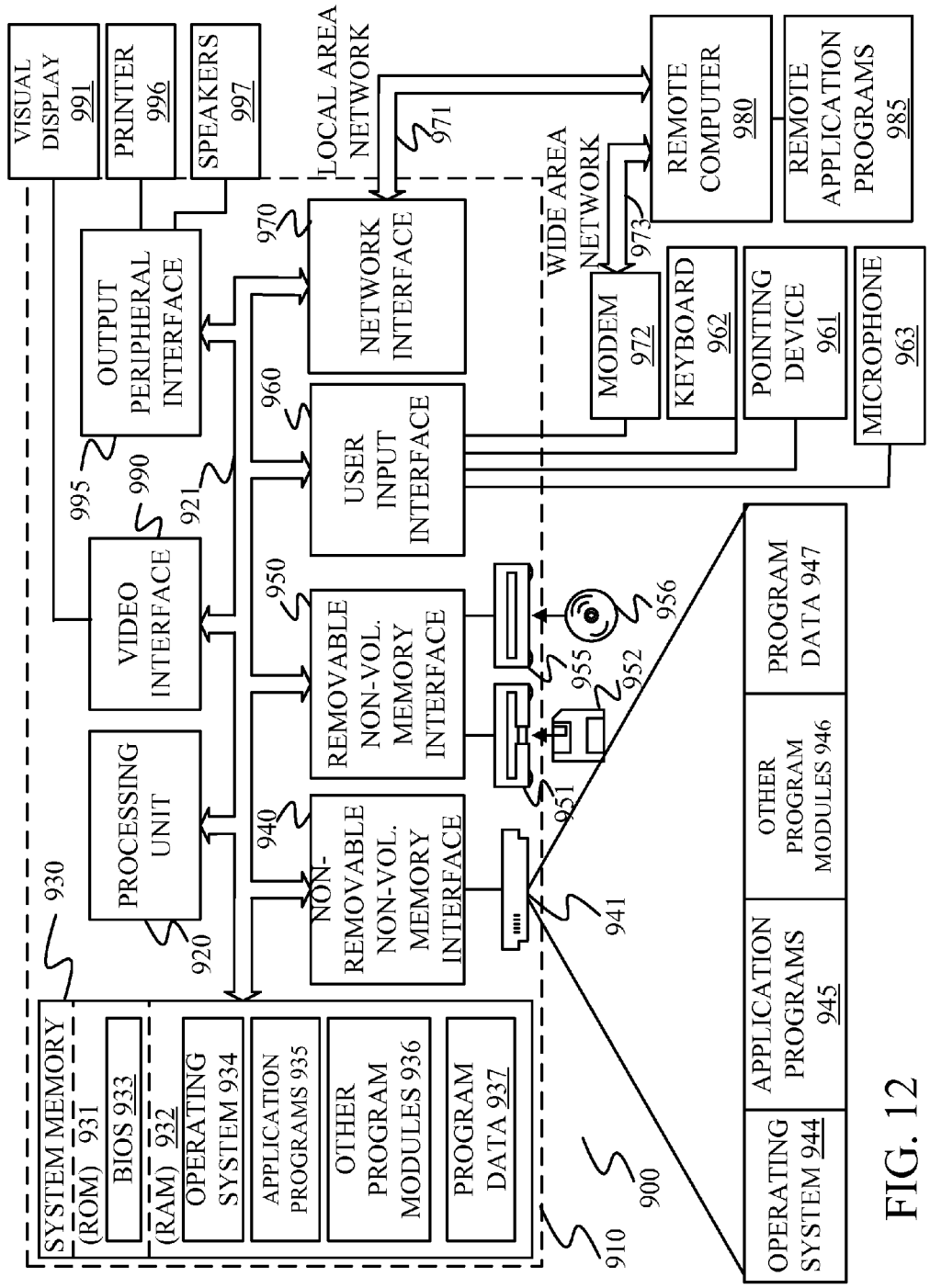
FIG. 12 is a block diagram of one example of a computing environment that can be used in various parts of the architectures set out in the previous figures.

FIG. 12 is one embodiment of a computing environment in which architecture 100, or parts of it, (for example) can be deployed. With reference to FIG. 12, an exemplary system for implementing some embodiments includes a general-purpose computing device in the form of a computer 910. Components of computer 910 may include, but are not limited to, a processing unit 920 (which can comprise any of the processors discussed above), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 12 illustrates operating system 934, application programs 935, other program modules 936, and program data 937.

The computer 910 may also include other removable/non-removable volatile/nonvolatile computer storage media. By way of example only, FIG. 12 illustrates a hard disk drive 941 that reads from or writes to non-removable, nonvolatile magnetic media, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 910. In FIG. 12, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 12 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 12 illustrates remote application programs 985 as residing on remote computer 980. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a development system comprising a user interface component and a customization component configured to receive developer customization inputs and to customize a portion of a computing system based on the developer customization inputs. The portion comprises types modeled in the computing system. The development system also comprises a test generation component configured to identify a test value by accessing a test knowledge set based on the modeled types, control the user interface component to generate a user interface display that displays an indication of the test value, and generate a test for the portion of the computing system.

Example 2 is the development system of any or all previous examples, wherein the test knowledge set comprises the test value stored in associated with at least one of the types.

Example 3 is the development system of any or all previous examples, wherein, for each of a plurality of types modeled in the computing system, the test knowledge set stores a mapping of one or more test values to the type.

Example 4 is the development system of any or all previous examples, wherein the portion comprises a plurality of types modeled in a type hierarchy, and wherein the test generation component is configured to identify the test value based on the type hierarchy.

Example 5 is the development system of any or all previous examples, wherein the portion comprises an application element having a first type, and wherein the test generation component is configured to identify a second type that is hierarchically related to the first type within the type hierarchy.

Example 6 is the development system of any or all previous examples, wherein the test generation component comprises a type hierarchy accessing component configured to identify the second type as being hierarchically related to the first type by traversing the type hierarchy.

Example 7 is the development system of any or all previous examples, wherein the test generation component is configured to identify a first test value, associated with the first type, from the test knowledge set and to identify a second test value, associated with the second type, from the test knowledge set.

Example 8 is the development system of any or all previous examples, wherein the test generation component is configured to control the user interface component to generate the user interface display that displays indications of the first and second test values.

Example 9 is the development system of any or all previous examples, wherein the test generation component is configured to generate the test based on the first and second test values.

Example 10 is the development system of any or all previous examples, wherein the portion comprises a first application element having a first type and a second application element having a second type, and wherein the test generation component is configured to identify a first test value, associated with the first type, from the test knowledge set and to identify a second test value, associated with the second type, from the test knowledge set.

Example 11 is the development system of any or all previous examples, wherein the user interface display displays the test value as a suggested test value for the test, and wherein the user interface display includes a test value acceptance mechanism for user acceptance of the suggested test value and a test value modification mechanism for user modification of the suggested test value.

Example 12 is the development system of any or all previous examples, wherein the test generation component is configured to identify a plurality of test values, and wherein the user interface display includes a user input mechanism that receives a user test value combination input that defines how the test values are combined in generating the test.

Example 13 is a test generation framework for a computing system. The test generation framework comprises an identifier component configured to identify a portion of the computing system for which a test is to be generated. The portion comprises at least a first type modeled in the computing system. The test generation framework comprises a test knowledge set accessing component configured to access a test knowledge set that includes a test value associated with the first type modeled in the computing system, and an automated test generation component configured to generate the test based on the test value.

Example 14 is the test generation framework of any or all previous examples, wherein the type comprises a first type, and the test generation framework comprises a type hierarchy accessing component configured to identify one or more other types that are hierarchically related to the first type by traversing a type hierarchy.

Example 15 is the test generation framework of any or all previous examples, wherein the test knowledge set accessing component is configured to identify a first test value, associated with the first type, from the test knowledge set and to identify a second test value, associated with the one or more other types, from the test knowledge set.

Example 16 is the test generation framework of any or all previous examples, wherein the automated test generation framework generates the test to include the first and second test values.

Example 17 is a development environment for developing a computing system. The development environment comprises a hierarchical type system framework that models types within a type hierarchy, a test knowledge store accessing component configured to access a test knowledge store that stores test values, and a test generation component configured to generate a test of the computing system. The test generation component is configured to obtain a set of test values by controlling the test knowledge store accessing component based on the type hierarchy.

Example 18 is the development environment of any or all previous examples, and further comprising a test knowledge generation component configured to generate test knowledge that is stored in the test knowledge store in association with a given type.

Example 19 is the development environment of any or all previous examples, wherein the test generation component is configured to generate the test for testing an element of the computing system, the element comprising a first type modeled by the hierarchical type system framework, wherein the test generation component obtains the set of test values by controlling the test knowledge set accessing component to obtain test values associated with the first type and to obtain test values associated with a second type, the second type being hierarchically related to the first type within the type hierarchy.

Example 20 is the development environment of any or all previous examples, and further comprising a user interface component that generates a user interface display with user input mechanisms that receive a user input that defines a combination of test values from the set of test values, wherein the test is generated based on the combination of test values.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. An electronic development system comprising:
a processor; and
memory storing instructions executable by the processor, wherein the instructions, when executed, configure the electronic development system to provide:
a customization component configured to:
receive an indication of a customization input; and
customize a portion of a computing system based on the indication of the customization input, wherein a plurality of types are modeled in the computing system, the plurality of types being hierarchically related within a type hierarchy, and wherein the portion of the computing system comprising an application element of a first type, of the plurality of types, modeled in the computing system; and
a test generation component configured to:
access a test knowledge data store that stores mappings between the types modeled in the computing system and test values;
identify a second type that is hierarchically related to the first type within the type hierarchy;
based on the test knowledge data store, identify a test value that is mapped to the second type; and
based on the identified test value, generate a test for the portion of the computing system, the test being configured to utilize the test value to test the portion of the computing system.

2. The electronic development system of claim 1, wherein the test generation component is configured to:
control a user interface component to generate a representation of a user interface display that includes an indication of the test value, the user interface display including a test generation user input mechanism;
receive an indication of user actuation of the test generation user input mechanism; and
based on the indication of user actuation of the test generation user input mechanism, generate the test for the portion of the computing system.

3. The electronic development system of claim 2, wherein the test generation component is configured to identify a set of test values based on the test knowledge data store, the set of test values including the identified test value and one or more other test values, and the representation of the user interface display includes an indication of the set of test values, the user interface display including a test value modification user input mechanism, wherein the user interface component is configured to:
receive an indication of user actuation of the test value modification user input mechanism; and
based on the indication of user actuation of the test value modification user input mechanism, modify the set of test values, wherein the test is generated based on the modified set of test values.

4. The electronic development system of claim 1, wherein the wherein the test generation component is configured to:
control a user interface component to generate a representation of a user interface display that includes an indication of the test value.

5. The electronic development system of claim 4, wherein the test generation component is configured to control the user interface component to generate the representation of the user interface display to include indications of the first and second test values.

6. The electronic development system of claim 5, wherein the test generation component is configured to generate the test based on the first and second test values.

7. The electronic development system of claim 6, wherein the test generation component is configured to identify a plurality of test values, and wherein the representation of the user interface display includes a test value combination user input mechanism, the test generation component being configured to:
receive an indication of user actuation of the test value combination user input mechanism;
determine a type of combination to use in combining how the test values; and
generate the test by combining the test values in accordance with the determined type of combination.

8. The electronic development system of claim 4, wherein the representation of the user interface display represents the test value as a suggested test value for the test, and wherein the representation of the user interface display includes a test value acceptance mechanism and a test value modification mechanism, and wherein the test generation component is configured to:
- based on an indication of user actuation of the test value acceptance mechanism, accept the suggested test value for generation of the test; and
- based on an indication of user actuation of the test value modification mechanism, modify the suggested test value.

9. The electronic development system of claim 1, wherein the test generation component comprises a type hierarchy accessing component configured to identify the second type as being hierarchically related to the first type by traversing the type hierarchy.

10. The electronic development system of claim 1, wherein the test generation component is configured to identify a first test value, associated with the first type, from the test knowledge data store and to identify a second test value, associated with the second type, from the test knowledge data store.

11. The electronic development system of claim 1, wherein the portion comprises a first application element having a first type and a second application element having a second type, and wherein the test generation component is configured to identify a first test value, associated with the first type, from the test knowledge data store and to identify a second test value, associated with the second type, from the test knowledge data store.

12. An electronic test generation framework for a computing system, the electronic test generation framework comprising:
- a processor; and
- memory storing instructions executable by the processor, wherein the instructions, when executed, configure the electronic test generation framework to:
  - identify a portion of the computing system for which a test is to be generated, wherein a plurality of types are modeled in the computing system, and the identified portion comprises a first type of the plurality of types modeled in the computing system;
  - access a type hierarchy that hierarchically associates the plurality of types modeled in the computing system;
  - based on the type hierarchy, identify a second type of the plurality of types that is hierarchically related to the first type;
  - access a test knowledge set that includes a test value associated with the second type modeled in the computing system; and
  - generate the test based on the test value.

13. The electronic test generation framework of claim 12, wherein the second type is identified by traversing the type hierarchy.

14. The electronic test generation framework of claim 13, wherein the instructions configure the electronic test generation framework to:
- identify a first test value, associated with the first type, from the test knowledge set; and
- identify a second test value, associated with the second type, from the test knowledge set.

15. The electronic test generation framework of claim 14, wherein the instructions configure the electronic test generation framework to generate the test to include the first and second test values.

16. An electronic development environment for developing a computing system, the electronic development environment comprising:
- a processor; and
- memory storing instructions executable by the processor, wherein the instructions, when executed, configure the electronic development environment to provide:
  - a hierarchical type system framework that hierarchically models types within a type hierarchy;
  - a test knowledge store accessing component configured to access a test knowledge store that stores test values in association with the types; and
  - a test generation component configured to:
    - identify a first type modeled by the hierarchical type system framework;
    - based on the test knowledge store, identify a first test value associated with the first type;
    - identify a second type that is hierarchically related to the first type within the type hierarchy;
    - based on the test knowledge store, identify a second test value associated with the second type; and
    - based on the first and second test values, generate a test configured to utilize the first and second test values to test the portion of the computing system.

17. The electronic development environment of claim 16, wherein the instructions configure the electronic development environment to provide a test knowledge generation component configured to generate test knowledge that is stored in the test knowledge store in association with a given type.

18. The electronic development environment of claim 16, wherein the instructions configure the electronic development environment to provide:
- a user interface component configured to generate a representation of a user interface display that includes an indication of a set of test values including at least the first and second test values, the user interface display including a test value modification user input mechanism;
- receive an indication of user actuation of the test value modification user input mechanism;
- based on the indication of user actuation of the test value modification user input mechanism, modify the set of test values;
- receive an indication of user actuation of the test generation user input mechanism; and
- based on the indication of user actuation of the test generation user input mechanism, generate the test based on the modified set of test values.

19. The electronic development environment of claim 16, wherein the instructions configure the electronic development environment to provide:
- a user interface component configured to generate a representation of a user interface display with a user input mechanism that receive an indication of a user input that defines a combination of test values from the set of test values, wherein the test is generated based on the combination of test values.

* * * * *